(12) United States Patent
Cutting

(10) Patent No.: US 10,993,435 B2
(45) Date of Patent: May 4, 2021

(54) METHOD AND SYSTEM FOR FREEZING BIOPHARMACEUTICAL FLUID

(71) Applicant: SARTORIUS STEDIM NORTH AMERICA, Bohemia, NY (US)

(72) Inventor: Jonathan Cutting, East Setauket, NY (US)

(73) Assignee: SARTORIUS STEDIM NORTH AMERICA, INC., Bohemia, NY (US)

( * ) Notice: Subject to any disclaimer, the term of this patent is extended or adjusted under 35 U.S.C. 154(b) by 159 days.

(21) Appl. No.: 16/072,592

(22) PCT Filed: Jan. 26, 2017

(86) PCT No.: PCT/US2017/015110
§ 371 (c)(1),
(2) Date: Jul. 25, 2018

(87) PCT Pub. No.: WO2017/132363
PCT Pub. Date: Aug. 3, 2017

(65) Prior Publication Data
US 2019/0029248 A1    Jan. 31, 2019

(30) Foreign Application Priority Data
Jan. 27, 2016   (EP) .................................... 16153036

(51) Int. Cl.
*A01N 1/02* (2006.01)
*F25C 1/12* (2006.01)
*F25C 1/04* (2018.01)

(52) U.S. Cl.
CPC ......... *A01N 1/0263* (2013.01); *A01N 1/0252* (2013.01); *F25C 1/12* (2013.01); *F25C 1/04* (2013.01)

(58) Field of Classification Search
CPC ....... A01N 1/0263; A01N 1/0252; F25C 1/12; F25C 1/04
See application file for complete search history.

(56) References Cited

U.S. PATENT DOCUMENTS 2,942,430 A    6/1960  Rising et al.
3,143,249 A *  8/1964  Merrill ................ B65D 77/065
                                                  222/105
(Continued)

FOREIGN PATENT DOCUMENTS

WO    WO 2009/105737    8/2009

OTHER PUBLICATIONS

International Search Report, PCT/US2017/015110, dated May 30, 2017.
Written Opinion, PCT/US2017/015110, dated May 30, 2017.

*Primary Examiner* — Kun Kai Ma
(74) *Attorney, Agent, or Firm* — Nixon & Vanderhye

(57) ABSTRACT

Disclosed is a method and system for freezing a biopharmaceutical fluid which is hold in a disposable container. The method includes the steps of arranging the container on the heat transfer surface area, cooling the heat transfer surface area to cool the bottom surface of the container until freezing and forming a layer of ice or an ice block of biopharmaceutical fluid inside the container; dislodging the ice layer or ice block frozen to the container. The steps of cooling the heat transfer surface area and dislodging the ice layer or ice block are repeated until the container is filled with a matrix of frozen biopharmaceutical fluid and liquid biopharmaceutical fluid, the liquid biopharmaceutical fluid occupying interstitial passages between ice layers or ice blocks of biopharmaceutical fluid. The cooling is then maintained until the freezing of the entire biopharmaceutical fluid held in the container.

20 Claims, 5 Drawing Sheets

(56) References Cited

U.S. PATENT DOCUMENTS

| | | | | |
|---|---|---|---|---|
| 4,178,776 | A | 12/1979 | Baldus et al. | |
| 4,490,982 | A * | 1/1985 | Christmas | A01N 1/00 |
| | | | | 62/3.2 |
| 7,081,226 | B1 * | 7/2006 | Wittwer | B01L 3/5025 |
| | | | | 422/50 |
| 2008/0120984 | A1 * | 5/2008 | Shaham | A01N 1/0257 |
| | | | | 62/62 |
| 2010/0195074 | A1 * | 8/2010 | Sogard | F24S 40/55 |
| | | | | 355/67 |
| 2012/0073312 | A1 * | 3/2012 | Cutting | G01N 29/2437 |
| | | | | 62/62 |
| 2013/0038469 | A1 * | 2/2013 | Burke | A01N 1/0263 |
| | | | | 340/870.07 |
| 2014/0228718 | A1 * | 8/2014 | Diller | A61F 7/10 |
| | | | | 601/18 |
| 2015/0046364 | A1 * | 2/2015 | Kriss | G06Q 10/0833 |
| | | | | 705/333 |
| 2019/0003939 | A1 * | 1/2019 | Milne | B01L 3/5082 |
| 2019/0178576 | A1 * | 6/2019 | De Beer | F26B 5/06 |

* cited by examiner

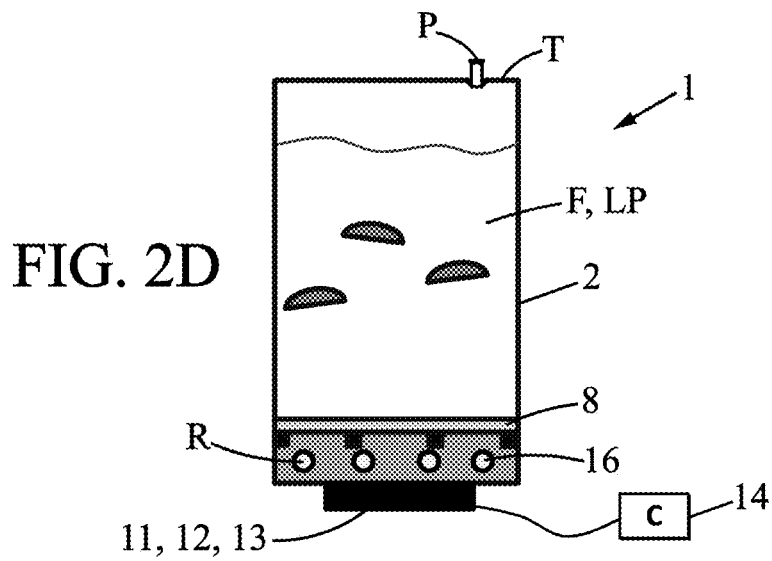
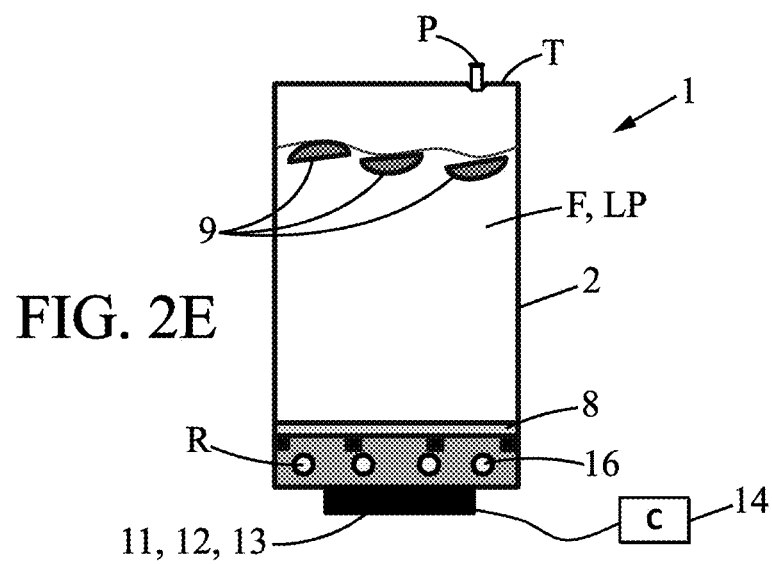
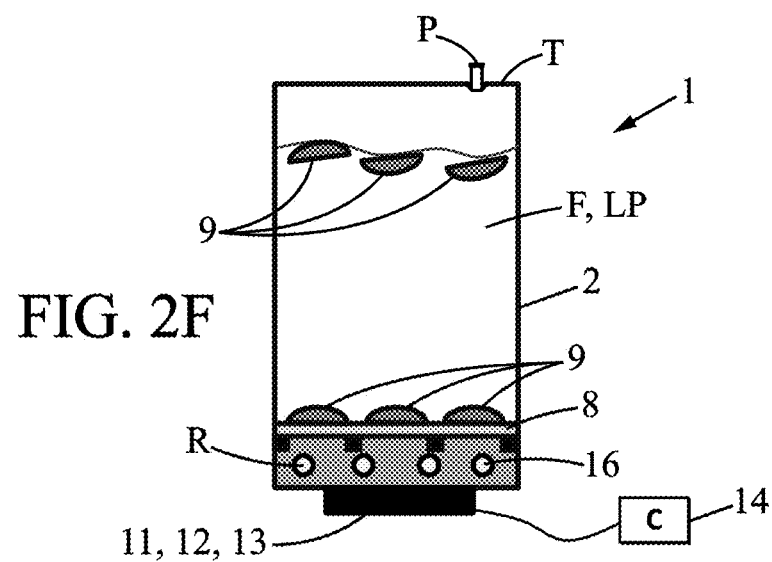

METHOD AND SYSTEM FOR FREEZING BIOPHARMACEUTICAL FLUID

FIELD OF THE INVENTION

This invention relates, in general, to biopharmaceutical fluids, preservation methods and systems, and more particularly to systems and methods for freezing biopharmaceutical fluids.

In the context of the invention, the term "biopharmaceutical fluid" is understood to mean a fluid derived from biotechnology—culture media, cell cultures, buffer solutions, artificial nutrition liquids, blood fractions and derivatives of blood products, or a pharmaceutical fluid, like drug substances or drug products or more generally a fluid for use in the medical field. The biopharmaceutical fluid is an aqueous solution.

BACKGROUND OF THE INVENTION

Preservation of biopharmaceutical fluids is important in the manufacture, use, transport, storage and sale of such materials, and in general in the medical field. Biopharmaceutical fluids are often preserved by freezing between processing steps and during storage. Similarly, biopharmaceutical fluids are often frozen and thawed as part of the development process to enhance the quality or to simplify the development process. When freezing biopharmaceutical fluids, the overall quality, and in particular pharmaceutical activity, of the biopharmaceutical fluids is desirably preserved, without substantial degradation of the biopharmaceutical fluids. More particularly, the freezing of liquid products can increase the stability of the product and thereby prolong the shelf life of those liquid products. However, the freezing of such materials has to be conducted according to stringent criteria in order to avoid any degradation of the biopharmaceutical fluid to freeze. In particular, the speed of freezing is an important criterion.

The preservation of biopharmaceutical fluid, particularly in bulk quantities, often involves, according to a first method, placing a container containing biopharmaceutical fluid in a laboratory freezer or blast freezer and allowing the biopharmaceutical fluid to freeze. Free or forced convection conveys thermal energy away from the container. Generally, the container is typically one or more liters in volume and may range up to ten or more liters. These containers may be stainless-steel vessels, plastic bottles or carboys, or plastic bags. They are typically filled with a specified volume to allow for freezing and expansion and then transferred into the freezers at temperatures typically ranging from negative 20 degrees Celsius to negative 70 degrees Celsius or below.

A second method which consists to place one or more walls of the container with an extended heat exchange surface that is cooled by refrigerant also exists.

Such methods are also called outside-in freezing process.

Such freezing methods do not allow a rapid freezing, in particular for container having large volumes and significant thickness. If the freezing is too slow, the active material may be subject to degradation from concentration gradient.

Actually, the above-mentioned freezing methods do not allow a rapid freezing of container having for example a cubical shape. More particularly such freezing methods do not allow a rapid freezing for systems having a large freeze path length. Indeed, with such methods, ice is at first formed on the walls of the container. The ice formation rate is determined by the overall heat transfer coefficient between the solid/liquid interface of the biopharmaceutical fluid and the bulk heat transfer fluid. The bulk transfer fluid is either air in case of freezer or refrigerant in case of heat exchanger. As the freezing process progresses, the rate of freezing falls because the resistance to heat transfer through the ice layer increases. In certain cases, the resistance to heat transfer through the ice layer becomes the dominant resistance and is the rate-limiting step.

In such cases, the only way to speed up the freeze in a container of given geometry in such an outside-in freezing process is to use lower and lower freezing temperatures. For example, cryogenic temperatures ranges are used. The cryogenic temperature range is from −150° C. to −273° C.

However, the use of always-lower temperature can become costly and even sometimes hazardous to operators.

Such speed problems are also addressed by adjusting container dimensions so that the freeze path length is relatively short, for example, the freeze path length is less than 50 millimeters. However, such solution has limits because for larger container volumes, the width and length of flat containers become unwieldy.

The specific properties of biopharmaceutical fluids have also led to the development of others containers specially adapted for freezing, for example having a slightly flared shape as described in EP 1,441,586. EP 1,407,302 describes another system that is particularly suitable for trapezoidal containers. Recently, an improved freezing system for bags was disclosed in WO 2011/063381.

However, to perform an efficient freezing with such systems, the containers must have specific shapes.

The publication US2007/0137842 deals notably with the problem of cooling biopharmaceutical fluid. The described system comprises a vessel in which a plurality of heat transfer surfaces is arranged.

The use of such system implies to provide a plurality of heat transfer surfaces. The structure of the system is complicated and the position of the heat transfer surface within the interior volume of the vessel implies the use of a vessel having a particular shape.

The embodiments of the present invention have objectives to mitigate the drawbacks discussed above.

SUMMARY OF THE INVENTION

To this aim, according to a first aspect of the invention, a method for freezing biopharmaceutical fluid comprises the steps of:
  a) Providing a disposable container having a bottom surface and a top surface, the bottom surface and the top surface delimiting at least partly a cavity and the container being provided with at least one port;
  b) Providing a cooling device comprising a heat transfer surface area;
  c) Arranging the container on the heat transfer surface area, the bottom surface of the container being directed toward the heat transfer surface area;
  d) Filling the cavity of the container with a biopharmaceutical fluid through the port;
  e) Cooling the heat transfer surface area to cool the bottom surface of the container until freezing and forming a layer of ice or at least an ice block of biopharmaceutical fluid inside the cavity on the bottom surface of the container;
  f) Dislodging the ice layer or ice block frozen to the bottom surface from the bottom surface of the container;
  g) Repeating the steps of cooling the heat transfer surface area and dislodging the ice layer or at least one ice block from the bottom surface until the cavity is filled with a matrix of frozen biopharmaceutical fluid and liquid biopharmaceutical fluid, the liquid biopharmaceutical fluid occupying interstitial space between ice layers or ice blocks of biopharmaceutical fluid;

h) Maintaining the cooling until the whole biopharmaceutical fluid has been frozen.

With such method, biopharmaceutical fluids in containers of any shape and dimensions can be frozen in a rapid way, without any reconditioning in another container such as a flat or flared container or without a particularly low temperature with regard to the freezing temperature of the biopharmaceutical fluid.

Besides, such method is easy to implement and safe for the user. Such method can be used for any type of biopharmaceutical fluids. Such method can for example be used for bulk DS/DP (drug substance/drug product), freezing of process intermediates and cell freezing (i.e. with high cell density for inoculation of N−1 bioreactor).

In the context of the invention, the term 'ice layer' or 'layer of ice' is understood to mean a flat portion of frozen fluid. The term 'ice block' is understood to mean a portion of frozen fluid being big enough to be seen to the naked eye.

In some embodiments, a person of ordinary skill in the art might also use one or more of the following features.

In one embodiment, the steps of cooling the heat transfer surface area and dislodging the ice layer or ice block are alternatively performed until the cavity contains at least 30%, and for example at least 50% of frozen biopharmaceutical fluid based on total biopharmaceutical fluid in the cavity. In other words, the steps of cooling the heat transfer surface area and dislodging the ice layer or ice block are repeated one after the other until the container contains a large rate of solid phase with regard to the liquid phase. The rate of 30% can be raised to 50% or 60% or 75% or 80%, or 90% depending on the biopharmaceutical fluids. Actually, the steps of cooling and dislodging (steps d) and e)) are repeated until the container is filled with ice layers or blocks and the content of the container becomes a matrix of biopharmaceutical fluid in a solid phase (ice layers or blocks) with biopharmaceutical fluid in a liquid phase occupying interstitial spaces between the ice layers or blocks.

In one embodiment, the temperature used in step e) to cool the heat transfer surface is the same temperature than the temperature used in step f) for maintaining the cooling. This way, the implementation of the temperatures is easy.

In one embodiment, the heat transfer surface area comprises insulating boundaries, which segment the formation of ice layers or ice blocks to create ice layers or ice blocks having a predetermined shape at the bottom surface of the container. These boundaries provided on the heat transfer surface area allow the formation of ice in predetermined areas of the heat transfer surface. The ice layers or blocks have then a predetermined shape or surface and are easier to dislodge. The ice layers or blocks have thus a smaller surface in contact with the bottom surface of the container and are easier to dislodge.

In an embodiment, the heat transfer surface area is cooled to a predefined cooling setpoint Tc, the predefined cooling setpoint Tc being between 0° C. and −196° C.

In one embodiment, the method comprises the step of providing a heating device able to heat the heat transfer surface area.

In one embodiment, the step of dislodging the ice layer(s) or ice block(s) is performed by heating the heat transfer surface area. The heating of the heat transfer surface area allows the layer of ice or ice blocks of biopharmaceutical fluid to be disconnected from the wall of the container. Indeed, the formation of the ice layer or ice block is directly made on the wall (on the bottom surface) of the container, which is in contact with the heat transfer surface area. The ice layers or blocks are frozen to the bottom surface of the container. The heating of the heat transfer surface area for a designated time period allows the melt of only the immediate surface between the layer of ice or the ice block and the bottom surface of the container, the melt of the immediate surface allows the ice block or ice layer to be detached from the bottom surface of the container.

In one embodiment, the cooling device and the heating device are arranged in the same apparatus. For example, the cooling device and the heating device are arranged in the same heat exchanger.

This feature allows a reduced size of the heating and cooling devices. The method is also easier to operate.

In one embodiment the heat transfer surface area is heated at a predefined heating setpoint Th, the predefined heating setpoint Th being above the melting temperature Tm of the biopharmaceutical fluid.

In one embodiment, the step of cooling the heat transfer surface area lasts a predetermined freezing time $t_{freeze}$, the predetermined freezing time is determined by the type of biopharmaceutical fluid in order to allow the growth of a sizeable ice layer or ice block. The predetermined freezing time $t_{freeze}$ is also determinate in order to avoid a significant decrease in the rate of cooling the biopharmaceutical fluid. Indeed, the increase in thickness of ice decreases the rate of cooling of biopharmaceutical fluid and thus the freezing process slows when the thickness of the ice increases. Therefore, the determination of $t_{freeze}$ is made by the type of biopharmaceutical fluid in order to allow the growth of a sizeable ice layer or ice block without significantly decreasing the rate of ice formation of the biopharmaceutical fluid inside the container . . . .

In one embodiment, the heat transfer surface area is heated during a predetermined heating time, the heating time being shorter than the freezing time.

In one embodiment, the cooling device is a heat exchanger comprising a refrigerant.

In one embodiment, the heat transfer surface area is cooled by flow of refrigerant through the heat exchanger.

In one embodiment, the refrigerant is a R-507 refrigerant or silicon oil or liquid nitrogen.

In one embodiment, the cooling device comprises a thermoelectric element. The thermoelectric element can be operated in order to heat or cool the heat transfer surface area.

In one embodiment, the method further comprises the step of providing a vibrator element.

In one embodiment, the vibrator element vibrates the container to perform the dislodging of ice layer(s) or ice block(s).

In one embodiment, the vibrator element provides ultrasonic vibration to dislodge the ice layer(s) or ice block(s) from the bottom surface of the container. The vibrator element can also be a conventional vibrator with mechanical vibrations.

In one embodiment, the step of dislodging the ice layer(s) or ice block(s) is performed by heating the heat transfer surface area and using the vibrator element to vibrate the container.

In one embodiment, during the step of dislodging the ice layer(s) or ice block(s), the container vibrates after the heating of the heat transfer surface area.

In a second aspect, the present invention relates to a system for freezing biopharmaceutical fluid comprising:
- a disposable container having a bottom surface and a top surface, the bottom surface and the top surface delimiting at least partly a cavity able to receive a biopharmaceutical fluid, the container being provided with at least one port;
- a cooling device comprising a heat transfer surface area, the cooling device being able to cool the bottom surface of the container until freezing and forming a layer of ice or ice block of biopharmaceutical fluid inside the cavity on the bottom surface of the container;
- a dislodging device able to dislodge the ice layer or ice block of biopharmaceutical fluid from the bottom surface of the container inside the cavity;
- a controller to alternatively command the cooling device and the dislodging device.

In one embodiment, the container comprises two ports, a first port for filling the cavity and a second port for draining the cavity.

In one embodiment, the container comprises one port used for filling and draining the cavity.

In one embodiment, the container comprises lateral surfaces, the top surface, the bottom surface and the lateral surfaces defining the cavity.

In one embodiment, the dislodging device comprises a heating device.

In one embodiment, the heating device and the cooling device are arranged within the same apparatus.

In one embodiment, the apparatus is commanded by the controller alternatively in a cooling mode, in which the heat transfer surface area is cooled and in a heating mode, in which the heat transfer surface area is heated.

In one embodiment, the dislodging device comprises a vibrator element adapted to vibrate the container.

In one embodiment, the cooling device is a heat exchanger comprising a refrigerant.

In one embodiment, the refrigerant is a R-507 refrigerant or silicon oil or liquid nitrogen.

In one embodiment, the heat transfer surface area of the cooling device comprises insulating boundaries.

In one embodiment, the container comprises walls and the walls of the container are rigid.

In one embodiment, the container is a pouch.

In one embodiment, the cooling device comprises a support, the container comprises a pouch, the pouch being supported by the support.

BRIEF DESCRIPTION OF THE DRAWINGS

Other characteristics and advantages of the embodiments of the present invention will readily appear from the following description of one of its embodiments, provided as non-limitative examples, and shown in the accompanying drawings.

ON THE DRAWINGS

Figure 1:
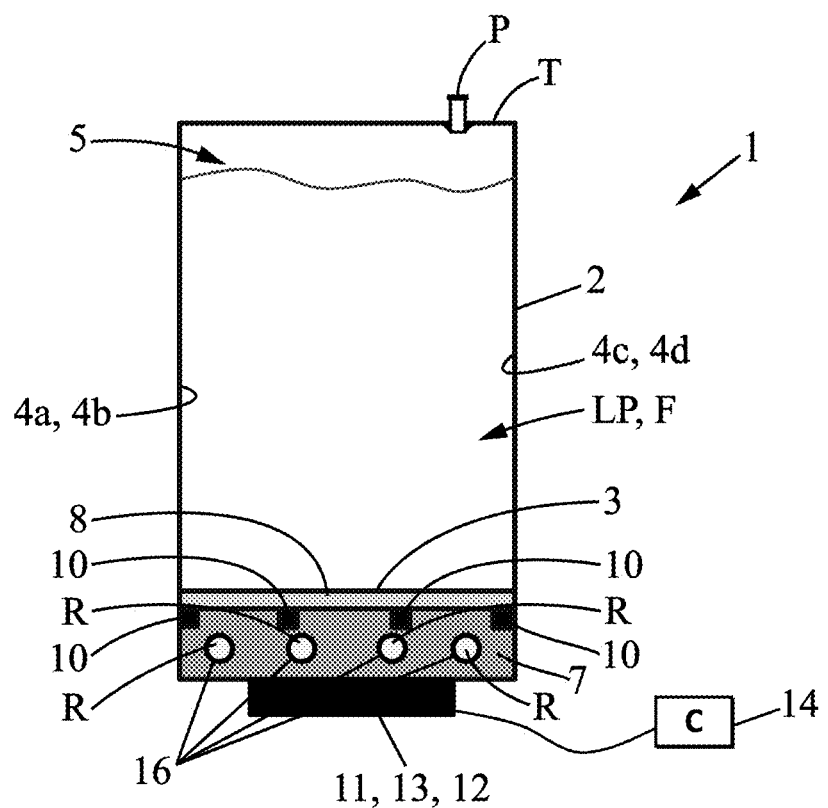

FIG. 1 is a schematic view of a system for freezing biopharmaceutical fluid according to one aspect of the invention comprising a container filled with a biopharmaceutical fluid, a controller, a cooling device and a dislodging device.

FIGS. 2A to 2I schematically represent different steps of a method for freezing biopharmaceutical fluid according to another aspect of the invention.

Figure 2A:
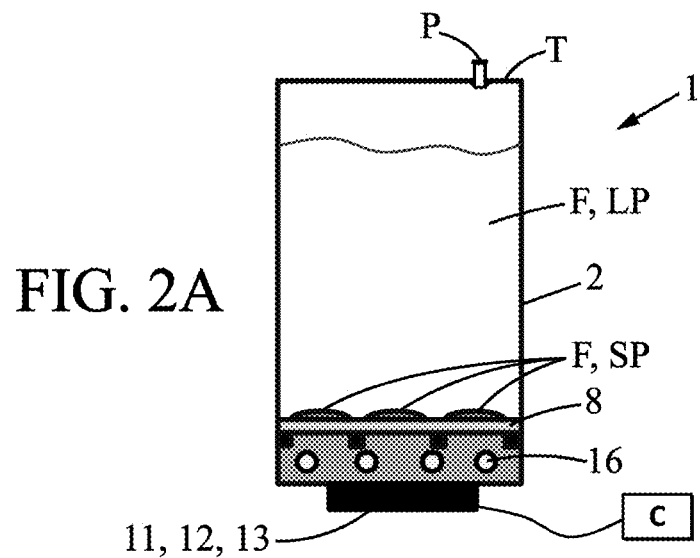
Figure 2B:
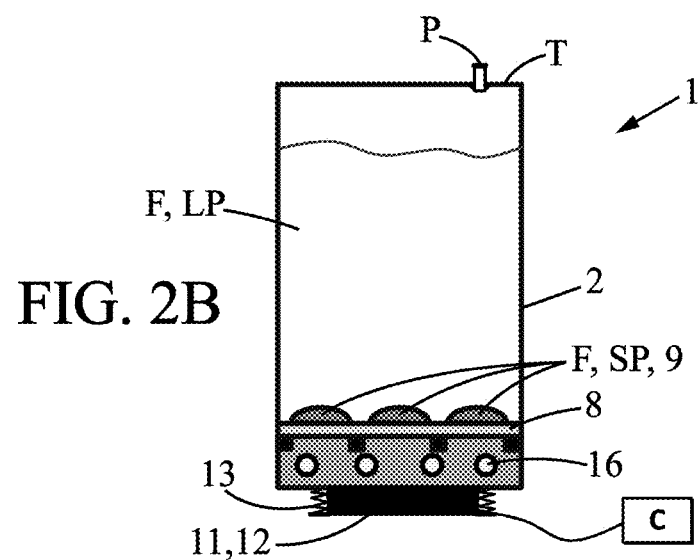
Figure 2C:
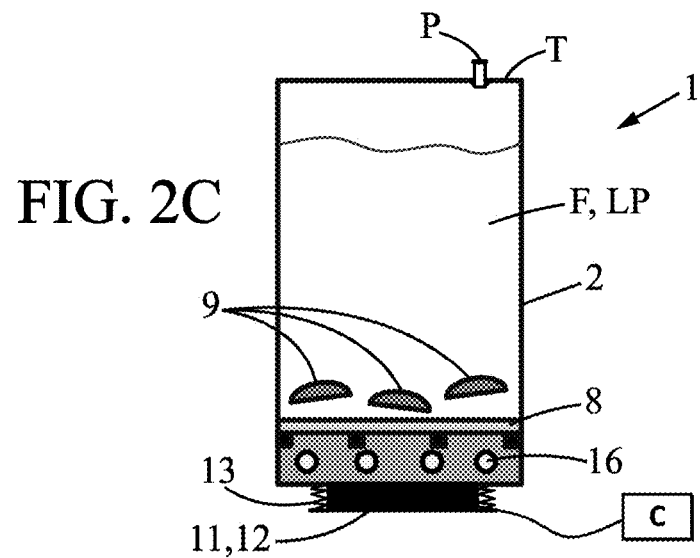
Figure 2G:
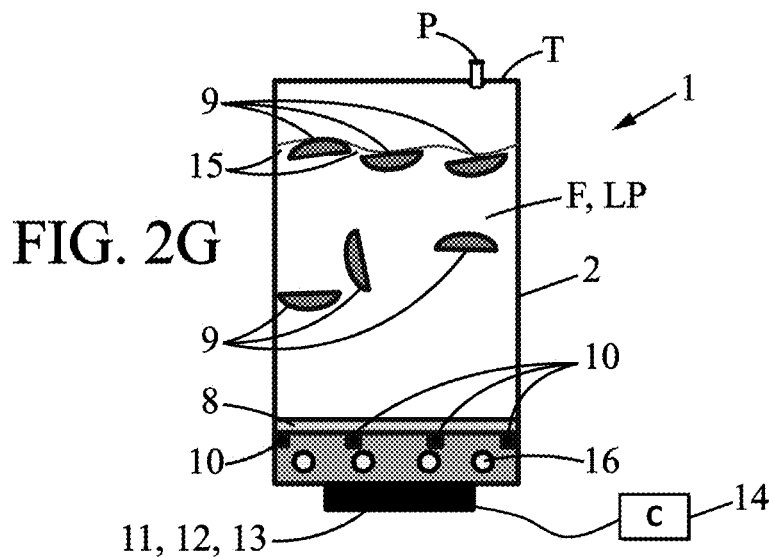
Figure 2H:
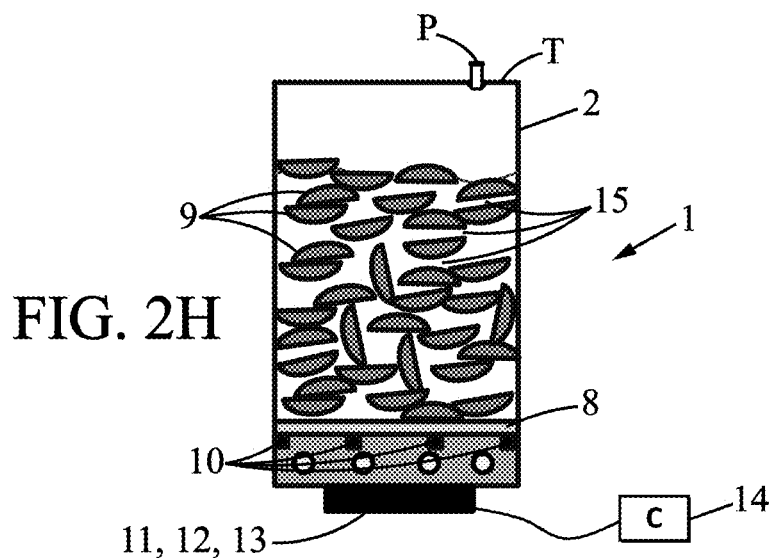
Figure 2I:
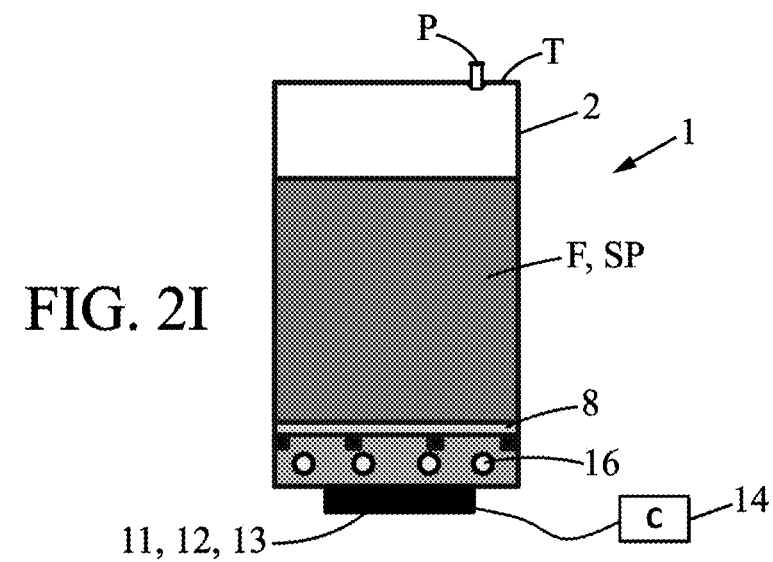
Figure 3:
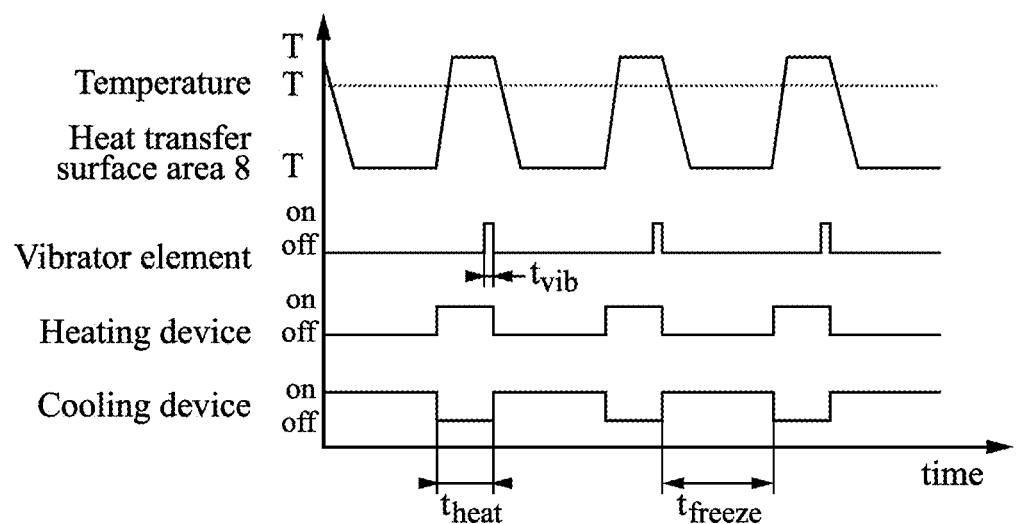

FIG. 3 is a graph illustrating an exemplary implementation of the controller shown in FIG. 1 to command the system of FIG. 1 in order to perform the method represented in FIGS. 2A to 2I.

On the different figures, the same reference signs designate like or similar elements.

DETAILED DESCRIPTION

The invention relates to a method and to a system 1 for freezing biopharmaceutical fluid F. An example of a system 1 for freezing a biopharmaceutical fluid F is shown in FIG. 1.

The system 1 for freezing biopharmaceutical fluid F comprises a container 2. The container 2 is a disposable container 2. The container 2 can be in plastic material.

In particular, the material of the container 2 is suitable for contact with a biopharmaceutical fluid F. For example, the container 2 is constructed of a suitable plastic such as polyethylene. The container 2 comprises walls, which define a cavity in which the biopharmaceutical fluid F is received. The container 2 can comprise rigid walls. The container 2 can also have semi-rigid or flexible walls.

The container 2 can be a pouch manufactured from a multilayer film such as described in WO 2014/111548. The pouch (or the walls of the pouch) define(s) the cavity in which the biopharmaceutical fluid is received. The container 2 can comprise a 2D pouch with two main walls (for example a bottom wall and a top wall) sealed together on their periphery. For example, the container can comprise a 3D pouch which is provided with a lower end wall (or bottom wall), an upper end wall (or top wall). The pouch can comprise flexible side wall. The flexible side wall can be in two end states—folded flat and deployed unfolded—and can be deformed to switch from one to the other of these states or to be in any intermediate state. The walls of the pouch, made of a plastic material such as polyethylene or a complex that comprises polyethylene, delimit an inner space (or cavity 5) that, in the folded state, has a minimum volume, and, in the unfolded and deployed state, has a maximum volume. This space (or cavity 5) is designed to accommodate the biopharmaceutical product for storage, treatment, and monitoring. Such a pouch offers a large capacity (flexible pouch can have a large volume of at least 50 liters up to 3,000 liters and even more), which justifies the fact that it is described as 3D while being able to be easily stored. An example of such a pouch is described in the International Application WO00/04131.

Typically, the container can have walls with a thickness in the range of about 50 micrometers to 3 millimeters. For example, if the container comprises flexible wall structures or the walls of the container defining the cavity consist in film, the thickness of the film can be between 50 and 700 micrometers. A container with rigid wall structure defining the cavity can for example have a thickness between 0.5 millimeters and 3 millimeters. The container can be foldable or not.

The cooling device or the container can comprise a support. The support can maintain the walls of the container defining the cavity. More particularly if the walls of the container defining the cavity in which the biopharmaceutical fluid is filled (or received) are flexible the support can maintain the walls notably during freezing. For example, the container can comprise a support and a pouch and the support maintains the pouch. For example, the support is a rigid structure surrounding walls (or internal walls) of the container. The support can comprise walls made with stainless steel or can be made with a metal mesh for example or a rigid plastic mesh. The support can also have complete support walls (or external walls) which surround the walls of the container defining the cavity (i.e. which surround the internal walls).

The shape of the container 2 can be cubical (this shape allows a good repartition of the biopharmaceutical fluid). Other shapes of the container 2, such as parallelepiped shapes are also possible. In particular, the container 2 may take any shape, notably a cylindrical shape, a parallelepiped shape or others shapes. If the container comprises a pouch, the container may have the shape of a pillow. The volume of the container 2 is such that the cavity defined by walls (internal walls) of the container 2 can be filled with a fluid for the purpose of storing, preserving or transporting for example.

As previously mentioned, the container 2 comprises walls. For example the container 2 comprises a bottom wall. The container also comprises a top wall. The container 2 can comprise lateral peripheral wall. In the embodiment where the container 12 has a parallelepiped form, the lateral peripheral wall may be erected in four panels, two-by-two, at right angles or parallel to one another. In a normal situation, the bottom wall and, if appropriate, the top wall, are arranged horizontally or substantially horizontally. The lateral peripheral wall is arranged vertically or substantially vertically, possibly slightly flared from the bottom wall. The container 2 can defined a closed space.

For example, the bottom wall comprises a bottom surface 3. The top wall comprises a top surface T. The lateral peripheral wall can comprise one or more lateral surfaces 4a, 4b, 4c, 4d. The bottom surface 3 and the top surface T delimit at least partly the cavity 5. More particularly, if the container 2 comprises lateral surfaces 4a, 4b, 4c, 4d, the bottom surface 3, the top surface T and the one or more lateral surfaces 4a, 4b, 4c, 4d can define the cavity 5. The cavity 5 forms the interior space of the container 2. The bottom surface 3, the top surface T are directed to the interior space of the container 2. The one or more lateral surfaces 4a, 4b, 4c, 4d are directed to the interior space of the container 2.

The container 2 defines for example a volume of one or more liters and may range up to ten or more liters, for example, the container may also range hundred liters or more. In other words, the cavity 5 (or interior space of the container 2) is one or more liters in volume and may range up to ten or hundred or more liters. As previously mentioned, can have a large volume of at least 50 liters up to 3,000 liters and even more.

The container 2 is filled with a biopharmaceutical fluid F. The container is provided with a port P. The port is an inlet and/or an outlet port. The port allows the filling of the cavity 5 with a biopharmaceutical fluid F. The container can also comprise several ports. For example, the container 2 can be provided with a port for filling with the biopharmaceutical fluid and a port for draining the biopharmaceutical fluid. A filing tube (not shown) having an inlet for filling the container with biopharmaceutical fluid and a drain tube (not shown) having an outlet for draining biopharmaceutical fluid from the container can be associated with these ports. The port(s) can be provided for example on the top wall of the container 2. The port(s) can also be provided on the peripheral walls of the container 2.

The container 2 or more particularly the assembly of the walls defining the cavity is airtight.

As previously mentioned, in the context of the invention, the term "biopharmaceutical fluid F" is understood to mean a fluid derived from biotechnology—culture media, cell cultures, buffer solutions, artificial nutrition liquids, blood fractions and derivatives of blood products, or a pharmaceutical fluid or more generally a fluid for use in the medical field. The biopharmaceutical fluid F is for example a drug substance or a drug product or cell culture.

The biopharmaceutical fluid F is firstly in a liquid phase LP. The biopharmaceutical fluid F hold in the cavity of the container 2 is for example at an ambient temperature.

The system 1 further comprises a cooling device 7. The cooling device 7 is able to cool the bottom surface 3 of the container 2 until the liquid freezes and forms a layer of ice or at least one ice block 9 of biopharmaceutical fluid F inside the cavity 5 on the bottom surface 3 of the container 2. For example, the cooling device 7 is able to cool the bottom surface 3 of the container 2 until the liquid freezes and forms several ice blocks 9 of biopharmaceutical fluid F inside the cavity 5. In the rest of the description, "an ice block" is to be understood as "at least one ice block".

The cooling device 7 comprises a heat transfer surface area 8. The heat transfer surface area 8 can be sensibly flat. The container 2 is adapted to be disposed on the heat transfer surface area 8. The container 2 can be removably disposed on the heat transfer surface area 8. The bottom surface 3 of the container 2 is directed toward the heat transfer area 8.

The cooling device 7 can be a heat exchanger for example. The heat exchanger comprises a refrigerant R. The refrigerant R is for example a R-507 refrigerant or silicone oil or liquid nitrogen. Liquid nitrogen is a very common and cheap coolant. In other embodiments, other refrigerant or coolants could be used. The heat transfer surface area 8 is cooled by flow of refrigerant through the heat exchanger. The refrigerant R can flow in channels 16 disposed inside the cooling device 7. The refrigerant can circulate in the channel 16 through a pump (not shown). The channels are for example spaced from the heat transfer surface area 8, and the spacing allows a distribution of the cold through the entire heat transfer surface area 8.

Parameters of the refrigerant such as flow rate and/or temperature can be used to affect the rate at which the biopharmaceutical fluid F is cooled.

In another embodiment, the cooling device 7 can comprise a thermoelectric element. The cooling device 7 is in this case based on the thermoelectric principle. Such devices use the Peltier effect. The switch of the polarity of the thermoelectric element allows either a heating or a cooling. Such thermoelectric devices can be interesting but the maximum cooling power and temperature difference in such devices are generally limited compared to heat exchanger with conventional refrigerants.

The heat transfer surface area 8 can be a plate having a rectangular shape. Other shapes could also be used such as oval, circular, square . . . shapes. The heat transfer surface area 8 is for example cooled by the refrigerant flowing through the channel of the heat exchanger. The heat transfer surface area 8 transfers heat to the bottom surface 3 of the container 2 through contact between the container 2 and the heat transfer surface area.

The heat transfer surface area 8 can transfer heat over its entire surface. In an embodiment, the heat transfer surface comprises insulating boundaries 10. The insulating boundaries 10 are portions or areas which are made of thermally insulated material and transfer significantly less heat. The insulating boundaries allow the creation of smaller ice blocks 9 instead of layer of ice or ice sheets. The ice blocks 9 are thus easier to release from the bottom side of the container.

The insulating boundaries 10 are for example arranged as a grid over the entire surface of the heat transfer surface area 8. The grid can be regular or not. The insulating boundaries 10 allow a subdivision of the entire heat transfer surface 8. For example, the insulating boundaries 10 project from the heat transfer surface area 8. In another embodiment, such as represented in FIG. 1, the insulating boundaries 10 are embedded in the heat transfer surface area 8 or are arranged just below the heat transfer surface area 8 in order to avoid the heat transfer in front of such insulating boundaries 10.

The system 1 further comprises a dislodging device 11. The dislodging device 11 is adapted to dislodge the ice layer or ice block 9 of biopharmaceutical fluid from the bottom surface 3 of the container 2 inside the cavity 5.

In one embodiment, the dislodging device 11 can dislodge the ice layer or ice block 9 frozen to the bottom surface 3 of the container 2 inside the cavity 5 by heating for a designated time period the bottom surface 3 of the container 2 such that a thin layer of the ice layer or ice block 9 melts. More particularly, the bottom surface 3 of the container 2 is heated such that a liquid film of the biopharmaceutical fluid on the immediate surfaces between the bottom surface 3 of the container 2 and the layer of ice or ice block 9 is developed and permit the layer of ice or the ice block 9 to be detached from the bottom surface 3 of the container 2. The dislodging device 11 is then a heating device 12.

The heating device 12 and the cooling device 7 can be arranged in the same apparatus. More particularly, the above-described cooling device 7 can also be used as a heating device 12. Indeed, in the case that the cooling device 7 is a heat exchanger, the refrigerant in the heat exchanger can be heated and heat the heat transfer surface. In other words, the heat exchanger is the cooling device 7 as well as the heating device 12. If the cooling device 7 comprises a thermoelectric element, by switching the polarity of the thermoelectric element, it is also possible to heat the heat transfer surface area 8. The thermoelectric element is then used for the cooling device 7 and for the heating device 12.

The heating device 12 can be a thin heater, for example polyimide foil type, to heat the bottom wall of the container 2 and release layer of ice or ice block 9 by melting.

In an alternative embodiment, the dislodging device 11 can dislodge the ice layer or ice block 9 frozen to the bottom surface 3 of the container 2 inside the cavity 5 by vibration. For example, a vibrator element 13 is adapted to vibrate the container 2. The vibrator element 13 can be disposed below the cooling device 7 and vibrate the entire cooling device 7 and the heat transfer surface area 8 and the container 2 such as illustrated in FIG. 1. The vibrator element 13 can also be integrated to the heat transfer surface area 8 to vibrate only the heat transfer surface area 8 and the container 2. The vibrator element 13 can also be directly connected to the container 2 and vibrate only the container 2.

The vibrator element 13 can be for example an ultrasonic vibrator such as a transducer transmitting ultrasonic high frequency to the container 2. The vibrator element 13 can also be a mechanical vibration generator.

In another alternative embodiment, the dislodging device 11 can dislodge the ice layer or ice block 9 frozen to the bottom surface 3 of the container 2 inside the cavity 5 both through the heating of the bottom surface 3 of the container 2 for a designated time period and through the vibration of the container 2. The dislodging device 11 comprises then a vibrator element 13 and a heating device 12. The heating device 12 is for example, as described above, combined with the cooling device 7.

The heating device 12 and the vibrator element 13 can be used simultaneously during the same time period, or can be used with a defined phase shift. For example, firstly the heat transfer surface is heated for a designated time period, the vibrator element 13 being off and at the end of the heating the vibrator is switch on. The vibrator element 13 can also be turned on directly after the heating of the heat transfer surface area 8 or a short time after the beginning of the heating of the heat transfer surface area 8 and before the end of the heating of the heat transfer surface area 8.

The system comprises a controller 14. The controller 14 commands the cooling device 7 and the dislodging device 11. The controller 14 can alternatively command both cooling and dislodging device 11s. The controller 14 allows commanding the cooling device 7 for a determined time period $t_{freeze}$. The controller 14 can also command the dislodging device 11 for a determined time period. The implementation of the time period can be made directly by an operator depending on the viscosity of the biopharmaceutical fluid F and/or the nature of the biopharmaceutical fluid F and/or the volume of the biopharmaceutical fluid F to be frozen and/or the global surface of the heat transfer surface area 8.

The dislodging device 11, the cooling device 7 can be a fixed equipment on which a removable container 2 can be arranged for the freezing.

A sensor (not illustrated) to monitor the temperature of the container 2 or of the bottom surface 3 of the container 2 can be provided.

In order to perform the freezing of biopharmaceutical fluid F, an operator can use the following method to obtain a rapid freezing of the biopharmaceutical fluid F.

In a first step, the container 2 is provided.

The container 2 holds biopharmaceutical fluid F. A sensor can be provided to control the fill level of biopharmaceutical fluid F in the container 2 and in particular to control the volume of biopharmaceutical fluid F in the container 2. The biopharmaceutical fluid F, is in a liquid phase LP. The biopharmaceutical fluid F is for example at a temperature Ta which is for example the ambient temperature. The container 2 comprises for example a pouch which is sealed such as described for instance in WO 2014/111548. The cooling device 7 comprises a support which maintains the pouch and/or the container.

In an alternative or complementary embodiment, the container can also comprise a support (or a holder) which maintains the pouch previously described.

In an alternative embodiment, the support is an extra-element. The support is thus connected to the container in order to support the latter.

In a second step, the cooling device 7 is provided with the heat transfer surface area 8.

In a third step, the container 2 is arranged on the heat transfer surface area 8, or the heat transfer surface area 8 is disposed under the container 2. The bottom surface 3 of the container 2 is directed toward the heat transfer surface 8 of the cooling device 7.

Eventually, the container 2 can be filled with the biopharmaceutical fluid F before or after arranging said container on the heat transfer surface area 8. The filling is made for example through an inlet port.

More particularly, the container 2 comprises a bottom having an external bottom surface and an interior bottom surface 3 (the interior bottom surface 3 being also called bottom surface 3). The bottom surface 3 of the container 2 is in contact with the biopharmaceutical fluid F and partly defines the cavity 5 of the container 2, as previously described. The external bottom surface of the container 2 is placed facing the heat transfer surface area 8, such as illustrated in FIG. 2A.

The external bottom surface of the container 2 can be arranged in contact with the heat transfer surface area 8.

In an alternative embodiment, the external bottom surface 3 of the container 2 can be directed toward the heat transfer surface area 8 and closely spaced from the heat transfer surface area 8.

In a fourth step, the heat transfer surface area 8 is cooled by the cooling device 7. In an alternative embodiment, the heat transfer surface area 8 can be cooled before to lay the container 2 on the heat transfer surface area 8.

The heat transfer surface area 8 is cooled for a designated time period $t_{freeze}$. The time period is for example implemented in the controller 14 by an operator. The heat transfer surface area 8 is cooled to a predefined cooling setpoint Tc. The heat transfer surface area 8 is cooled for example by flow of the refrigerant in the channels if the cooling device 7 comprises a heat exchanger. The predefined cooling setpoint Tc can be implemented by an operator. The temperature can be monitored by a sensor to verify that the heat transfer surface area 8 and/or the bottom of the container 2 reaches the predefined cooling setpoint Tc. The predefined cooling setpoint Tc is for example below the biopharmaceutical fluid F freezing point at atmospheric pressure. By heat transfer from the bottom surface 3 to the heat transfer surface area 8 of the container 2, the biopharmaceutical fluid F begins to cool and then to freeze. The predefined cooling setpoint Tc is for example between 0° C. and −196° C.

Such as represented in FIGS. 2A and 2B, the layer of ice or ice block 9 grows at the bottom surface 3 of the container 2 until it achieves a sizeable shape. In the context of the invention, the term "sizeable shape" is understood to mean a shape big enough to be seen with the naked eye.

The insulating boundaries 10 allow the formations of multiple ice blocks 9 inside the container 2 simultaneously. For example, as illustrated in FIGS. 2A and 2B, three ice blocks 9 are formed. Depending on the presence or not of the insulating boundaries 10 and on the number and the shape of the insulating boundaries 10, the number of ice blocks 9 can be less or more than three. The insulating boundaries 10 segment the formation of ice layers or ice blocks 9 to create ice layers or ice blocks 9 having a predetermined shape at the bottom surface 3 of the container 2.

At the end of the designated time period $t_{freeze}$, a layer of ice or an ice block 9 is formed inside the cavity 5 at the bottom of the container 2. In other words, a layer or a block of biopharmaceutical fluid F is frozen to the bottom surface 3 of the container 2. The layer of ice or ice block 9 corresponds to the biopharmaceutical fluid F in a solid phase SP. The layer of ice or ice block 9 is surrounded by biopharmaceutical phase in a liquid phase LP.

The fifth step of the method consists in dislodging the layer of ice or the ice block 9 from the bottom surface 3 of the container 2. The layer of ice or the ice block 9 is released from the bottom surface 3 of the container 2. Cooling the biopharmaceutical fluid F from the bottom up is particularly advantageous. When a biopharmaceutical fluid F is being frozen, the density of frozen biopharmaceutical fluid F (i.e. biopharmaceutical fluid F in a solid phase SP) is less than that of the biopharmaceutical fluid F in the liquid phase LP. Therefore, when the layer of ice or ice block 9 is released from the bottom side, said layer of ice or ice block 9 lifts off inside the cavity 5 of the container 2 until it floats on the surface of the biopharmaceutical fluid F. The dislodging of the ice blocks 9 and the lift off are illustrated in FIG. 2C to 2E.

The releasing of the layer of ice or the ice block 9 is for example performed by heating the bottom surface 3 of the container 2. The heat transfer surface area 8 is heated by the heating device 12. The heat transfer surface area 8 warms the bottom surface 3 of the container 2. The bottom surface 3 of the container 2 is heated at a predefined heating setpoint Th. The predefined heating setpoint Th is above the melting temperature Tm of the biopharmaceutical fluid F in the container 2. The bottom surface 3 of the container 2 is heated such that a water film on the immediate surfaces between the container 2 bottom surface and the layer of ice or ice block 9 is developed. The water film allows the release of the layer of ice or the ice block 9 from the bottom surface 3 of the housing. The heat transfer surface area 8 is heated during a predetermined heating time $t_{heat}$. The predefined heating time $t_{heat}$ is small compared to the time period $t_{freeze}$. This allows maintaining a high time-average rate of ice formation.

The releasing of the layer of ice or the ice block 9 can also be performed by vibration. For example a vibrator element 13 vibrates the container 2, or at least the bottom of the container 2. The vibration frees the layer of ice or the ice block 9 from the bottom surface 3 of the container 2.

In an embodiment, the step of dislodging the layer of ice or ice block 9 is performed by both heating the bottom surface 3 of the container 2 and vibrating the container 2. For example, firstly the heating device 12 heats the bottom of the container 2 during a predetermined time period $t_{heat}$ and at the end of the predetermined time period $t_{heat}$ or shortly before the end of the predetermined time period $t_{heat}$, the vibrator element 13 vibrates the container 2 or the bottom of the container 2 during a predetermined time period $t_{vib}$.

In case the dislodging step is performed by the vibrator element 13 alone, the structure of the container 2 has to be resistant enough in order to avoid any risk of damage to cold wall or frozen wall of the container 2.

The fourth and fifth steps are repeated, as represented in FIGS. 2F and 2G until the cavity 5 is filled with a matrix of frozen biopharmaceutical fluid and liquid biopharmaceutical fluid. The released ice blocks 9 float to the top of the container and create a growing layer of solid material with interstitial passages 15.

The liquid biopharmaceutical fluid occupies interstitial passages 15 between ice layers or ice blocks 9 of biopharmaceutical fluid. For example, the cooling step and the dislodging step are alternatively repeated until the cavity 5 contains at least 30%, at 50% of frozen biopharmaceutical fluid based on total biopharmaceutical fluid in the cavity 5. In some embodiment, these steps can be repeated until the cavity 5 contains at least 50%, 60% 70%, 75%, and up to 90% or more of frozen biopharmaceutical fluid based on total biopharmaceutical fluid in the cavity 5.

When the cavity 5 is filled with a sufficient quantity of ice blocks 9 or layers of ice, such as represented in FIG. 2H, the cooling device 7 maintains the cooling at a predefined end cooling setpoint Tec. The end cooling setpoint Tec can be the same than the cooling setpoint Tc, or can be different, higher or lower. The end-cooling setpoint Tec is maintained until all interstitial voids between the layers of ice or ice blocks 9 have been frozen. The cooling is maintained until the freezing of the entire biopharmaceutical.

The content of the container 2 being entirely frozen, the container 2 can be moved from the heat transfer surface area 8 to be stored or transported for example.

FIG. 3 shows a diagram of a possible command by the controller 14 of the cooling device 7, heating device 12 and vibrator element 13. The container 2 with biopharmaceutical fluid F in a liquid phase is firstly disposed on the heat transfer surface area 8. Then the cooling device 7, heating device 12 and vibrator element 13 can be operated for example by repeating the following sequence:

Cooling device 7 on for a predefined time period $t_{freeze}$
Cooling device 7 off for a predefined time period
Heating device 12 on for a predefined time period $t_{heat}$
Vibrator element 13 on for a predefined time period $t_{vib}$
Heating device 12 and vibrator element 13 off for a predefined time period In FIG. 3, the first time diagram represents the temperature of the bottom surface 3 or of the heat transfer surface area 8. The second diagram represents the state on or off of the vibrator element 13 (the vibrator element being optional). The third diagram represents the state on or off of the heating device 12. The fourth diagram represents the state on or off of the cooling device 17.

During the sequence in which the cooling device 7 is on, the temperature of the bottom surface 3 of the container 2 decreases from, for example an ambient temperature, to the melting temperature of the biopharmaceutical fluid F and further to the predefined cooling setpoint. The temperature of the bottom surface 3 of the container 2 is maintained to the predefined cooling setpoint Tc until the switch off of the cooling device 7 and the switch on of the heating device 12.

The switch on of the heating device 12 implies a warming of the bottom surface 3 of the container 2. The temperature of the bottom surface 3 of the container 2 increases, reaches the melting temperature of the biopharmaceutical fluid F and increases further until reaching the predefined heating setpoint Th. Shortly after the bottom surface 3 reaches the predefined heating setpoint Th, the vibrator element 13 is switched on. In alternative embodiment, the vibrator can be switched on as soon as the bottom surface 3 reaches the predefined heating setpoint Th, or as soon as the bottom surface 3 reaches the melting temperature of the biopharmaceutical fluid F, or simultaneously when the heating device 12 is switched on to dislodge the ice blocks 9.

After the dislodging of the ice layers or ice blocks 9, the heating device 12 and the vibrator element 13 are switched off, and the cooling device 7 can again be switched on.

An alternating cool, heat, cool, heat cycle is repeated to freeze a portion of the biopharmaceutical fluid of the bottom surface 3 of the container 2 and then to release said portion to let the frozen portion float to the top of the container 2 under its own buoyancy. Thus, a container 2 with large path length may be frozen piecewise using a low cost heat exchanger.

A sensor may be provided inside the container 2 in order to determine if the rate of frozen biopharmaceutical fluid F with regard to non-frozen biopharmaceutical fluid F is sufficient or not to perform the last step of the method. If the rate of frozen biopharmaceutical fluid F with regard to non-frozen biopharmaceutical fluid F is not sufficient, the steps of cooling and dislodging the layer of ice or ice blocks 9 are repeated. If the rate of frozen biopharmaceutical fluid F with regard to non-frozen biopharmaceutical fluid F is sufficient, the heat transfer surface area 8 continues to cool the bottom surface 3 until the freezing of the entire content of the container 2.

The invention claimed is:

1. A system for freezing a biopharmaceutical fluid, the system comprising:

a disposable container having a bottom surface and a top surface, the bottom surface and the top surface at least partly delimiting a cavity that is configured to receive the biopharmaceutical fluid, the disposable container being provided with at least one port, the cavity being delimited by two main walls of the disposable container which are flexible and attached together at a peripheral seal, the disposable container being deformable between a folded flat state and a deployed unfolded state;

a cooler comprising a heat transfer surface area that extends under the bottom surface of the disposable container, the cooler being configured to cool the bottom surface of the disposable container from below until freezing and forming a layer of ice or at least one ice block of biopharmaceutical fluid inside the cavity on the bottom surface of the disposable container;

a dislodging device configured to dislodge the ice layer or the at least one ice block of biopharmaceutical fluid from the bottom surface of the disposable container inside the cavity, the dislodging device being disposed below the heat transfer surface; and a controller to alternatively command the cooler and the dislodging device.

2. The system according to claim 1, wherein the disposable container comprises lateral surfaces, the top surface, the bottom surface, and the lateral surfaces defining the cavity.

3. The system according to claim 1, wherein the heat transfer surface area of the cooler comprises insulating boundaries.

4. The system according to claim 1, wherein the dislodging device comprises a heater outside the disposable container.

5. The system according to claim 1, wherein the dislodging device comprises a vibrator element configured to vibrate the disposable container.

6. The system according to claim 4, wherein the dislodging device is configured to dislodge the ice layer or the at least one ice block frozen to the bottom surface from the bottom surface of the disposable container in the cavity, after changing a command of the cooler to warm up the heat transfer surface area, and
wherein the controller is configured to repeat cooling and heating cycles, with each of the cooling and heating cycles involving cooling the bottom surface via the heat transfer surface area and then dislodging the ice layer or the at least one ice block by warming up the heat transfer surface area.

7. A method for the freezing biopharmaceutical fluid, using the system according to claim 1, the method comprising:

providing the disposable container having the bottom surface and the top surface, the bottom surface and the top surface at least partly delimiting the cavity, the disposable container being provided with the at least one port;

providing the cooler comprising the heat transfer surface area;

arranging the disposable container on the heat transfer surface area, the bottom surface of the disposable container being directed toward the heat transfer surface area;

filling the cavity of the disposable container with the biopharmaceutical fluid through the at least one port;

cooling the heat transfer surface area to cool the bottom surface of the disposable container until freezing and forming the layer of ice or the at least one ice block of biopharmaceutical fluid inside the cavity on the bottom surface of the disposable container;

dislodging the layer of ice or the at least one ice block frozen to the bottom surface from the bottom surface of the disposable container in the cavity;

repeating the cooling the heat transfer surface area and repeating the dislodging the ice layer or the at least one ice block until the cavity is filled with a matrix of frozen biopharmaceutical fluid and liquid biopharmaceutical fluid, the liquid biopharmaceutical fluid occupying interstitial passages between ice layers or ice blocks of biopharmaceutical fluid; and after the repeating the cooling and the dislodging, maintaining the cooling until the freezing of the entire biopharmaceutical fluid held in the disposable container.

8. The method of claim 7, wherein the cooling and the dislodging are alternatively performed until the cavity contains at least 30% of frozen biopharmaceutical fluid based on total biopharmaceutical fluid in the cavity.

9. The method according to claim 7, wherein the heat transfer surface area comprises insulating boundaries which segment the formation of ice layers or the at least one ice block to create ice layers or ice blocks having a predetermined shape at the bottom surface of the disposable container.

10. The method according to claim 7, wherein the heat transfer surface area is cooled to a predefined cooling setpoint that is between 0° C. and −196° C.

11. The method according to claim 7, wherein the dislodging is performed by heating the heat transfer surface area, below the disposable container.

12. The method according to claim 11, wherein the heat transfer surface area is heated by a heat exchanger that extends below the disposable container, the heat exchanger being controlled to form, alternatively, the cooler and a heater.

13. The method according to claim 11, wherein the heat transfer surface area is heated at a predefined heating set point that is above the melting temperature of the biopharmaceutical fluid.

14. The method according to claim 11, wherein the cooling the heat transfer surface area lasts a predetermined freezing time, the heat transfer surface area being heated during a predetermined heating time that is shorter than the predetermined freezing time.

15. The method according to claim 7, wherein the cooler is a heat exchanger comprising a refrigerant, and
wherein the heat transfer surface area is cooled by flow of refrigerant through the heat exchanger.

16. The method according to claim 7, wherein the cooler comprises a thermoelectric element.

17. The method according to claim 7, further comprising providing a vibrator element outside the disposable container, the vibrator element vibrating the container to perform the dislodging.

18. The method according to claim 17, wherein the vibrator element provides ultrasonic vibration to dislodge the layer of ice layer or the at least one ice block from the bottom surface of the disposable container.

19. The method according to claim 17, wherein the dislodging is performed by heating the heat transfer surface area and using the vibrator element to vibrate the disposable container.

20. The method according to claim 19, wherein during the dislodging, the disposable container vibrates after the heating of the heat transfer surface area.

* * * * *